C. N. McFARLAND.
POWER TRANSMITTING MECHANISM FOR CALCULATING MACHINES.
APPLICATION FILED SEPT. 21, 1906.

902,103.

Patented Oct. 27, 1908.

Attest:

Inventor:
Charles N. McFarland
by William R. Baird
his Atty.

Fig. 3.

C. N. McFARLAND.
POWER TRANSMITTING MECHANISM FOR CALCULATING MACHINES.
APPLICATION FILED SEPT. 21, 1906.

902,103. Patented Oct. 27, 1908.

Attest:

Inventor:
Charles N. McFarland
by William R. Baird
his Atty.

Fig. 10.

C. N. McFARLAND.
POWER TRANSMITTING MECHANISM FOR CALCULATING MACHINES.
APPLICATION FILED SEPT. 21, 1906.

902,103.

Patented Oct. 27, 1908.
9 SHEETS—SHEET 8.

Attest:
Edgeworth Greene
Alan McDonnell

Inventor:
Charles N. McFarland
by William R. Baird
his Atty.

C. N. McFARLAND.
POWER TRANSMITTING MECHANISM FOR CALCULATING MACHINES.
APPLICATION FILED SEPT. 21, 1906.

902,103.

Patented Oct. 27, 1908.

Attest:

Charles N. McFarland, Inventor:
by William R. Baird,
his Atty.

UNITED STATES PATENT OFFICE.

CHARLES N. McFARLAND, OF KINGSTON, PENNSYLVANIA, ASSIGNOR TO THE ADDER MACHINE COMPANY, OF KINGSTON, PENNSYLVANIA, A CORPORATION OF PENNSYLVANIA.

POWER-TRANSMITTING MECHANISM FOR CALCULATING-MACHINES.

No. 902,103.      Specification of Letters Patent.      Patented Oct. 27, 1908.

Application filed September 21, 1906. Serial No. 335,573.

*To all whom it may concern:*

Be it known that I, CHARLES N. McFAR-LAND, a citizen of the United States, residing at Kingston, in the county of Luzerne and State of Pennsylvania, have invented certain new and useful Improvements in Power-Transmitting Mechanisms for Calculating-Machines, of which the following is a specification.

My invention relates to adding and printing machines and more particularly to means adapted to connect the actuating mechanism of such machines with a motor whereby the manual labor of operating the machine may be lessened; and its novelty consists in the construction and arrangement of the several parts, as will be more fully hereinafter pointed out.

Calculating machines have long been on the market and have generally been manually operated by a handle secured to a vibratory rock shaft, from which the parts have received their energy and motion. Attempts have been made to drive some of these machines by power and have involved the use of electric and other motors which have been thrown in and out of gear with the oscillating shaft by different devices. All of these devices known to me, however, had the disadvantage of positive connections to the calculating machine and faulty speed reducing mechanisms whereby only one actuation of the calculating machine could be obtained for each revolution of the driving shaft. They have also had defective clutch mechanisms which were subject to wear soon bringing the parts of the same out of working adjustment.

By means of my invention the subject of the present application, I provide a mechanism for transmitting the power of a motor to the actuating rock shaft of the calculating machine, brought into operation by the mere depression of a key by the operator and I also arrange the parts so that the actuation of the shaft is entirely similar to that which occurs when it is manually operated by a handle, although it may be quicker. Moreover, I have arranged the power transmitting mechanism in such a manner that I may actuate the adding machine three or more times for each rotation of the shaft of the motor employed. I also provide an automatic clutch mechanism which maintains its adjustment against shock and wear for an indefinite period. These means enable me to attach my power transmitting mechanism to any calculating machine having a vibratory rock shaft and to operate it at a great speed without injury to the parts. In this connection I do not deem it necessary to the understanding of my invention that I should describe an adding machine and its mode of operation. A well known form is shown in the patents to Wales Nos. 794,205 and 797,032; or in the patent to Rinsche, No. 654,181. Each of these comprise a series of keys, means for setting up in their several mechanisms the items indicated by the depression of the keys, means for accumulating such items and finally means for totalizing and registering or recording the totals. Each of these also has a vibratory shaft, the rocking of which actuates the carrying, registering, recording and restoring mechanism when the proper keys have been depressed and which rock shaft is returned to its original position by independent means.

Referring to the drawings, 1 indicates the base of an adding machine; 2 is a part of one of its side frames, of which there are two, one on each side of the machine, and 3, 3, are the keys actuating the accumulating mechanism (not shown). In the side frames are suitable apertures serving as bearings for the vibrating rock shaft 136 of the adding machine moved in the manner hereinafter described. Two brackets 4 (of which only one is shown) are mounted upon the base 1 and support a bar 5 transversely arranged across the machine. To this bar is secured one end of a main spring 6 to the other end of which is secured a link 7 pivoted to a crank 8 connected to the shaft 136. When the shaft 136 is rocked toward the operator, who stands in front of the machine, and the parts of the mechanism are moved thereby, the main spring 7 is stretched to an extent determined by the arc through which the shaft has been oscillated. When the shaft is released the energy stored in this spring is utilized to retract the parts to their initial positions. A brake member 9 secured to the shaft 136 serves to limit the reverse movement of the shaft, because such brake is brought into contact with a coöperating brake plate 10 suitably mounted upon the base of the machine.

Figure 10:
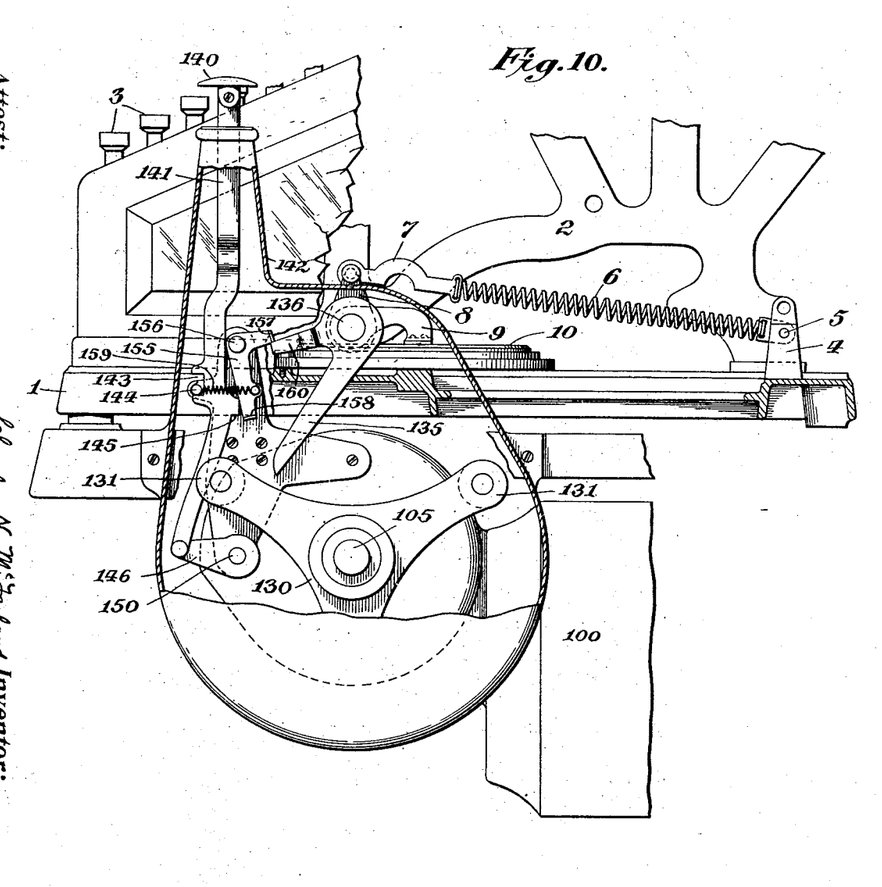
Fig. 10 is a side elevation of the power transmitting mechanism, a portion of its casing and some of the connected parts of the adding machine including the resetting spring.
Figure 11:
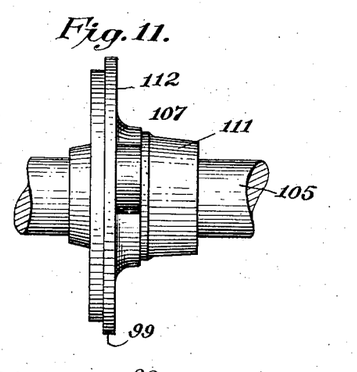
Figs. 11, 12, 13 and 14 are sundry detail views of the carrier.
Figure 12:
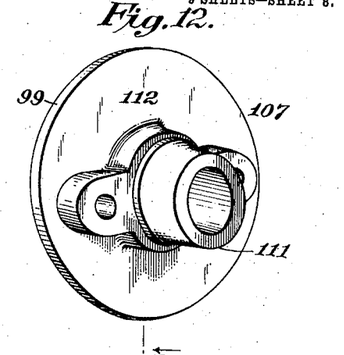
Figure 13:
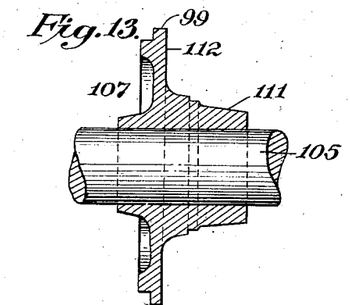
Figure 14:
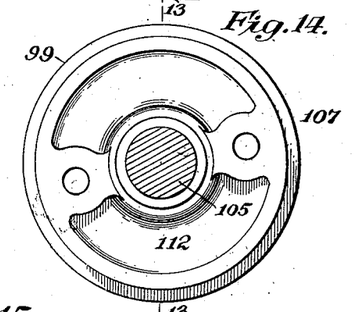
Figure 15:
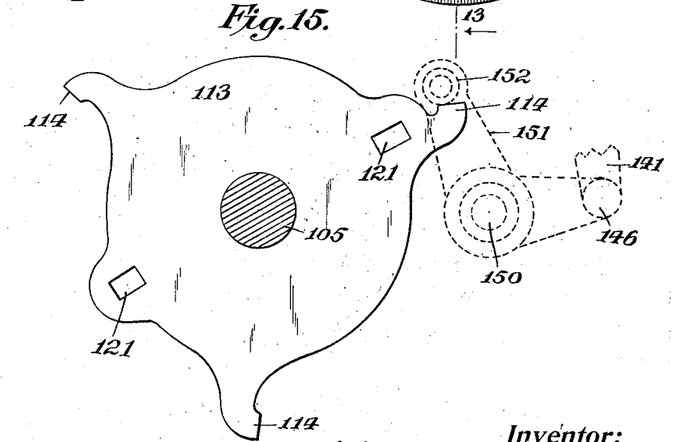
Fig. 15 is a plan of the control ring.
Figure 16:
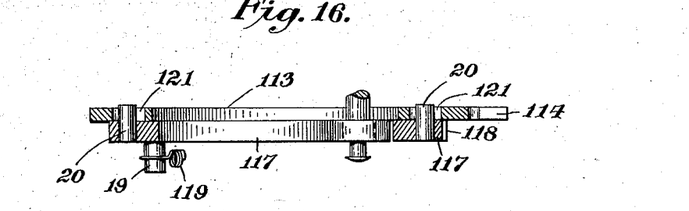
Fig. 16 is a section of the control ring and clutch arm.
Figure 17:
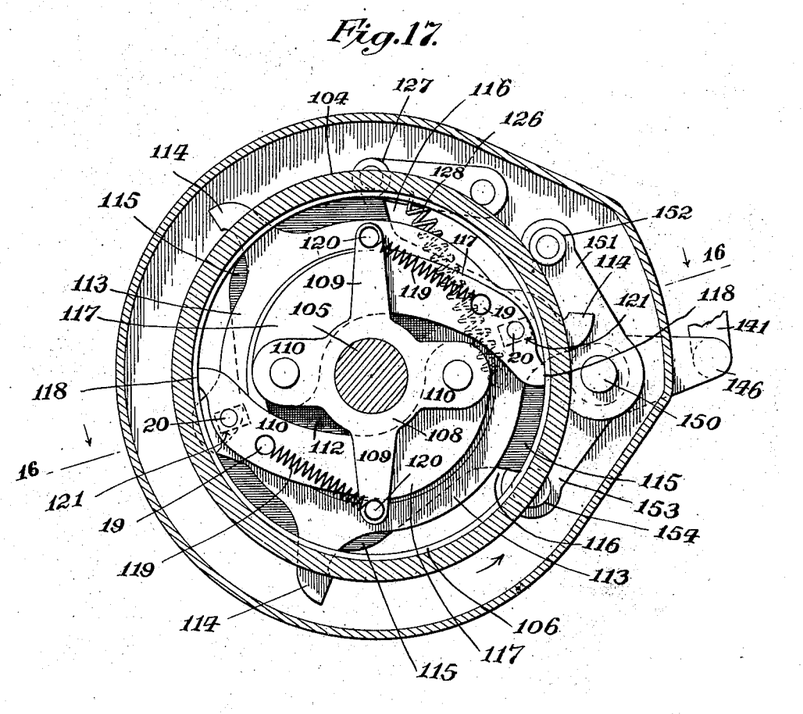
Fig. 17 is a view similar to Fig. 8 with the parts in altered positions.

The parts just described are best shown in Fig. 10 and form no part of my invention.

Figure 3:
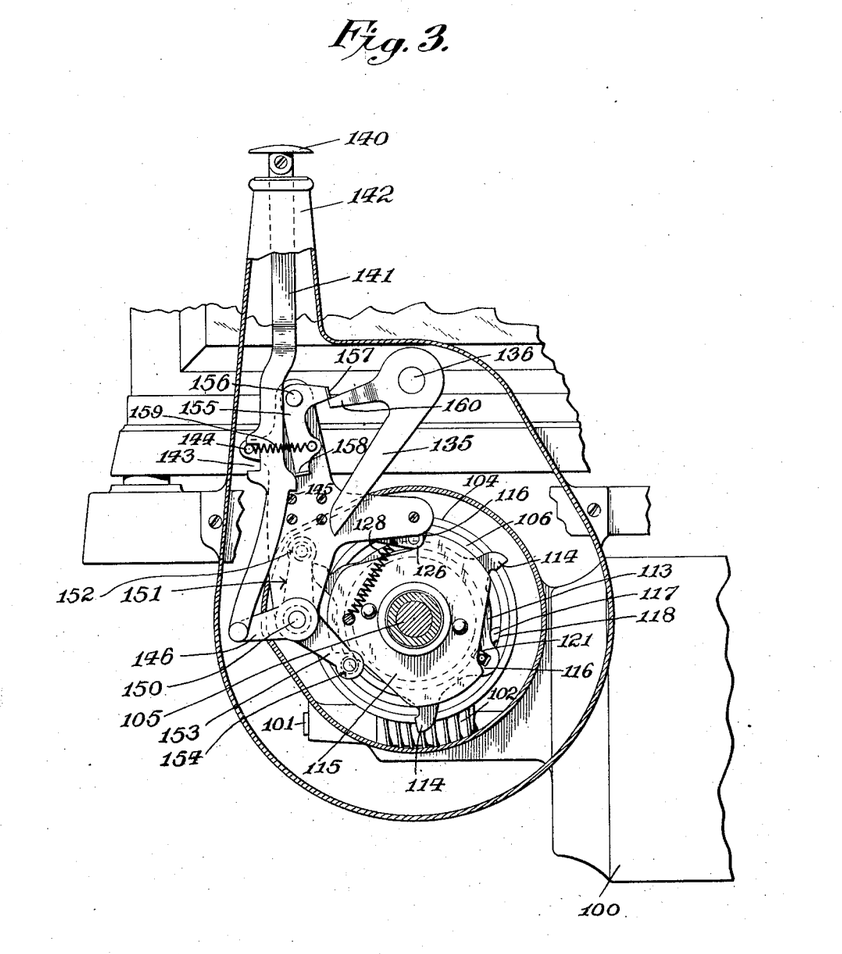
Fig. 3 is a vertical section on the plane of the line 3—3 in Fig. 2, and a partial elevation.
Figure 4:
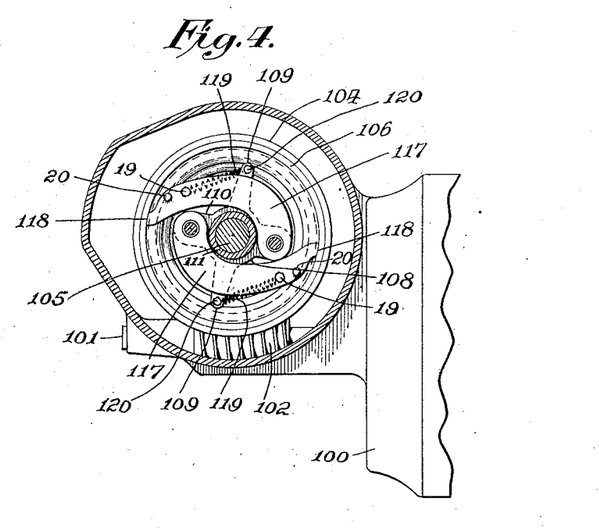
Fig. 4 is a vertical section on the plane of the line 4—4 in Fig. 2 omitting the adding machine parts.
Figures 5, 6, 7:
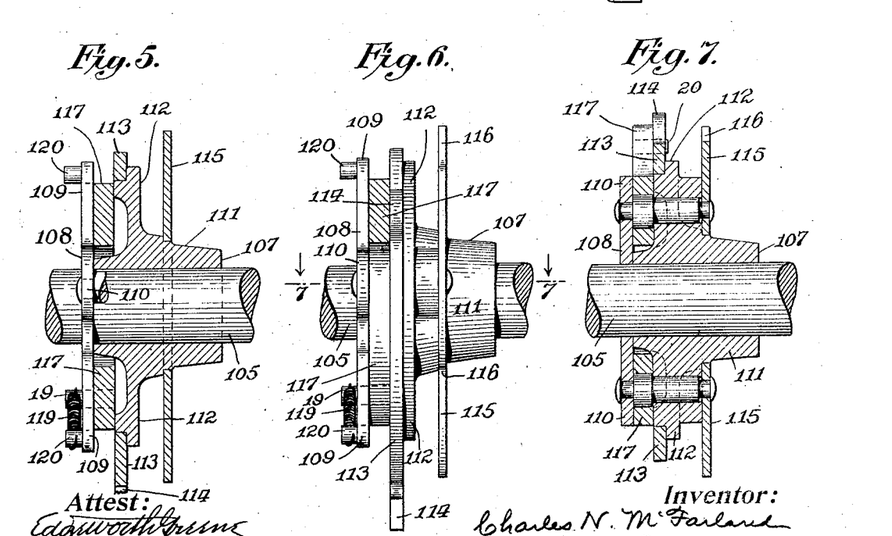
Fig. 5 is an enlarged view of the carrier and adjacent parts.
Fig. 6 is a side elevation of the parts shown in Fig. 5.
Fig. 7 is a horizontal section of the carrier and adjacent parts on the plane of the line 7—7 in Fig. 8.

100 indicates a motor of any suitable size and construction deriving its power from any suitable source and kind of energy and 101 is a shaft actuated therefrom and carrying a worm 102 which is in mesh with a worm gear 103 rigidly secured to a shell 104, so that the gear and shell constantly rotate on a counter shaft 105 on which they are loosely mounted. The shell 104 is also provided with an inner peripheral friction ring 106. Suitable means are provided for coupling the shell 104 to said counter shaft 105. The counter shaft 105 is provided with a carrier 107 supporting a plate 108 having radial arms 109 and 110 and which carrier is also provided with a hub 111 having a disk 112 provided at its edge with an annular flange 99 forming a seat for a loosely mounted control ring 113 having three toes 114. The hub 111 is provided with a cam disk 115 having depressions 116 at three points along its edge (best seen in Fig. 3). Eccentrically mounted on the plate 108, on each arm 110, there is a clutching arm 117 having a curved terminal surface 118 and provided with tension springs 119 secured to pins 19 on the arms 117 and the other ends of which springs 119 are secured to the arms 109 by pins 120 (see Figs. 4 and 8). The arms 117 are, also, provided with pins 20 adapted to engage with a slot 121 in the control ring 113.

Pivoted at any suitable point on the casing as 125 is a pawl 126 carrying a roller 127 adapted to engage the cam disk 115, fitting into the depressions 116 at its edge and which pawl is held against the disk 115 by a tension spring 128. At the outer extremity of the counter-shaft 105 there is mounted a plate 130 having three radial arms, 131, 131, 131, each provided with a roller 132 adapted to engage with an arm 135 mounted on the vibratory actuating rock shaft 136 of the adding machine.

Figure 1:
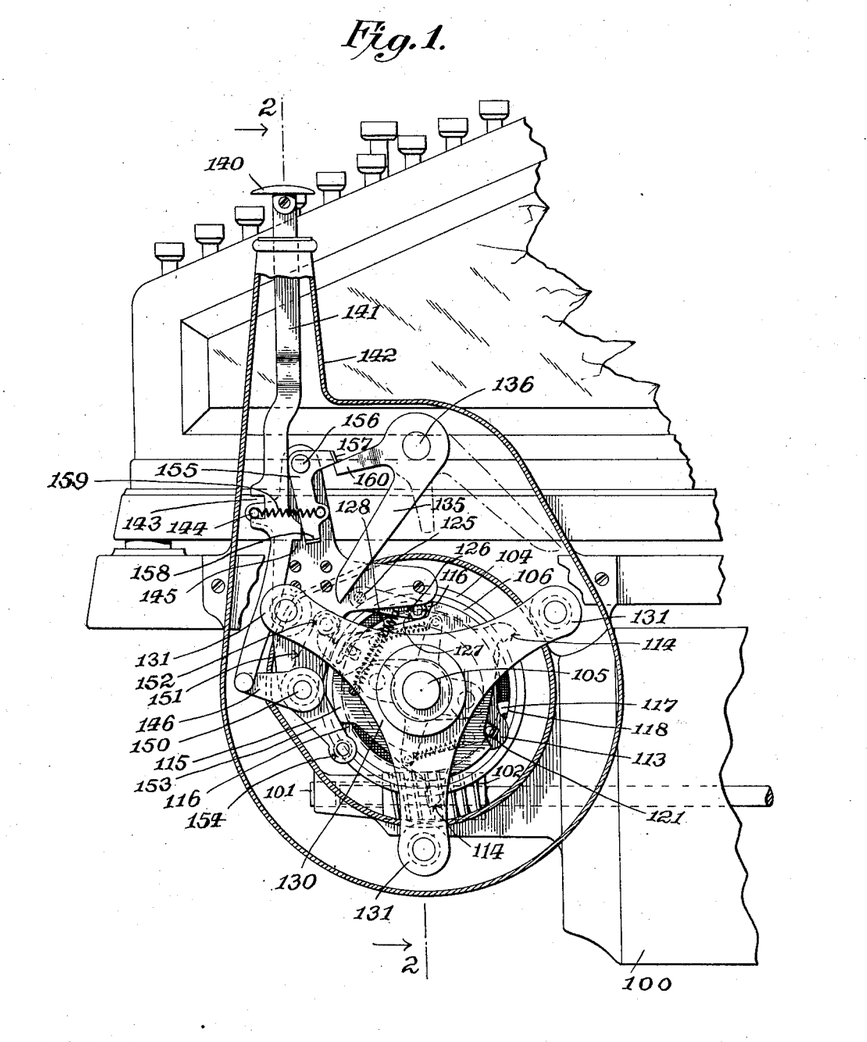
Figure 1 is a side elevation of the parts with the casing in section on the plane of the line 1—1 in Fig. 2.
Figure 2:
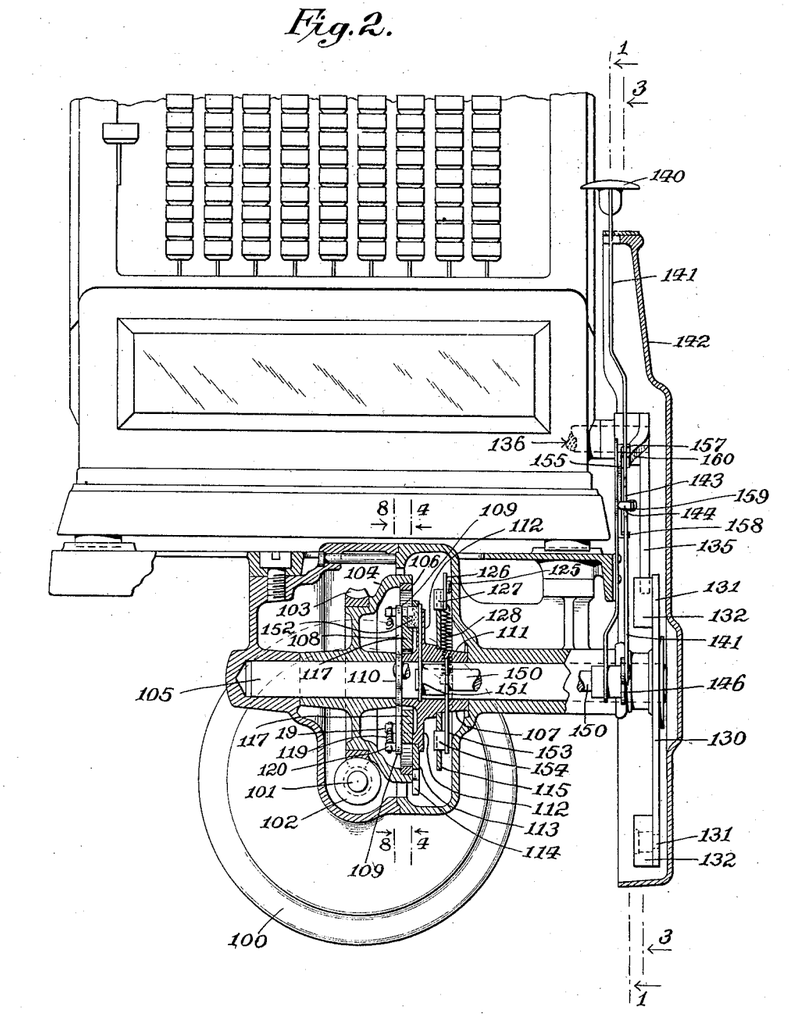
Fig. 2 is a vertical section on the plane of the line 2—2 in Fig. 1 and a partial front elevation.

140 is a key having a dependent stem 141 suitably supported and guided by a protecting frame 142. (See Fig. 2.) It is notched at 143 to embrace a pin 144 secured to the frame of the machine and which limits the extent of its movement. (See Figs. 1 and 2.) It is recessed at 145 for a purpose which will presently appear. At its lower extremity it is pivoted to an arm 146, the other end of which is secured to a rock shaft 150 adapted to oscillate in suitable bearings in the frame of the machine. Mounted on this rock shaft 150 is an arm 151 having a holder roller 152 adapted to engage with the toes 114, on the control ring 113 to hold the ring against movement. Also mounted on this rock shaft 150 is an arm 153 provided with a roller 154 adapted to engage the cam edges of the disk 115.

A bell crank lever 155 is pivoted on the frame of the machine at 156, having outwardly projecting lips 157 and 158, and which lever is yieldingly held by the spring 159 toward the key stem 141. On the shaft 136 is a trip 160 adapted to engage with the lip 157.

The functions of the several parts are as follows:—The motor shaft 101 and worm 102 with the shell 104 and its ring 106 constantly rotate. The purpose sought to be accomplished by the mechanism described is to transmit this rotary motion as may be required to the plate 130 and roller 132 in order that the roller shall engage with the arm 135 on the actuating shaft 136 so as to oscillate the latter and simulate the motion of the same when the adding machine is manually operated.

The carrier 107 and its related parts constitute a clutch mechanism which is adapted to throw the constantly rotated worm gears 102 and 103 into engagement with the countershaft 105 and which clutch mechanism is actuated by the depression of the key 140 by the operator. The contacting surfaces 118 of the arms 118 are normally held out of contact with the inner surface of the ring 106 through the action of the control ring 113 which is maintained in a stationary position by means of the holder 152. This is accomplished through the pins 20 on the arms 117, which pins engage the sides of the slots 121 formed in this control ring 113.

The holder 152 is automatically restored to its original position by means of the movement of the cam disk against the roller 154 of the arm 153.

When the roller holder 152 is moved out of the path of the toes 114, 114, of the ring 113, the arms 117 are at once pulled against the inner surface of the ring 106 by the tension of the spring 119 and contacting with such surface the rotary motion of the ring 106 is communicated to the carrier 107 and through it to the shaft 105, which, as it rotates, swings one of the rollers 132 against the arm 135 and oscillates the shaft 136 and so actuates the mechanism of the adding machine.

It will be noted that so long as the holder 152 is in contact with one of the toes 114, the clutch mechanism connecting the counter shaft 105 with the plate 130, whereby the rock shaft 136 is vibrated, is idle. It is obvious that as soon as the function of this holder is interrupted, the counter shaft 105 and the rock shaft 136 are in effect coupled together through the clutch mechanism and remain so coupled until the continued rotation of the cam plate 115, (forming part of this clutch mechanism) automatically restores the holder to its original position and function. The interruption of the function of this holder 152 is accomplished by the depression of the key stem 141, which moves the arm 146, rocks the shaft 150 and thereby moves the holder 152 out of engagement with the particular toe 114 then in contact therewith.

The method of operating the device is as follows:—After the required item has been set up on the adding machine by the depression of the keys in the usual manner, and it is desired to accumulate it in the machine, the operator depresses the key 140. This moves downwardly the key stem 141 until it is stopped on the pin 144. This movement swings the arm 146 to oscillate the rock shaft 150 and swings the holder arm 151 to move the holder 152 out of engagement with the toe 114 of the control ring 113. This operation simultaneously swings the restoring arm 153 in a direction opposite to that of the arm 151 and moves the roller 154 of such restoring arm into contact with the edge of the cam disk 115. The motor shaft 101 through the worm gear 102, 103, imparts a continuous rotary motion to the shell 104 which is loosely mounted on the shaft 105, and the function of the clutch mechanism is to communicate this motion of the shell to the shaft 105.

Figure 8:
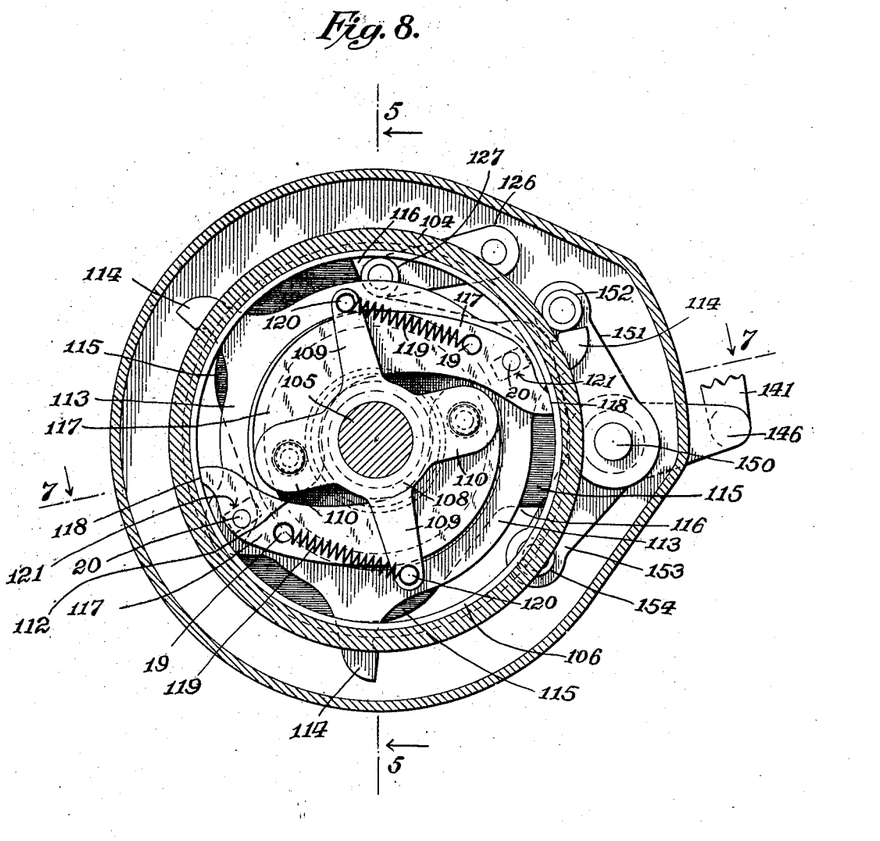
Fig. 8 is a vertical section on the plane of the line 8—8 in Fig. 2 omitting some of the parts.
Figure 9:
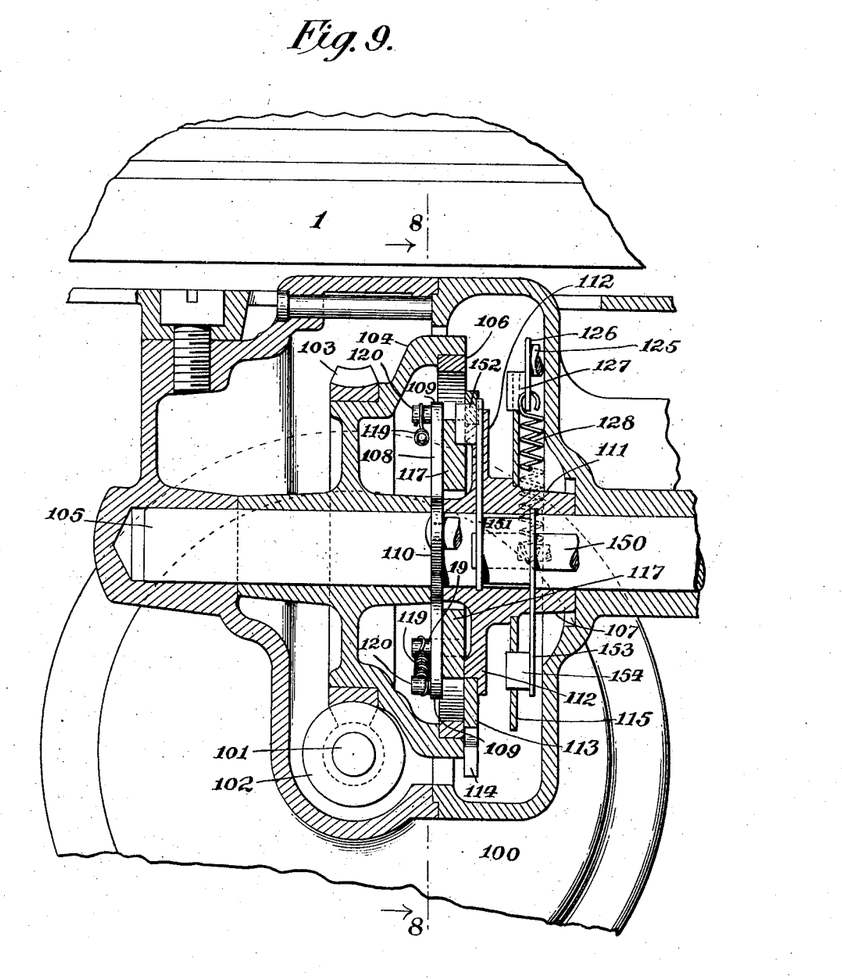
Fig. 9 is an enlarged view of the clutch mechanism (shown also in Fig. 2)

Previous to the depression of the key 140, the parts of the clutch mechanism are in the positions shown in Fig. 8 in which the arm 117 is shown held out of functional engagement with the inner surface of the ring 106 by means of its pin 20 which is pressed against the side of the slot 121 in the control ring 113 by the tension of the spring 119 and the motion of which is limited by the position of the side of this slot. The control ring is held in its position because one of its toes 114 is in contact with the holder 152. The roller 127 on the pawl 126 is in engagement with the recess 116 of the cam disk 115, and this engagement prevents the backward rotation of the cam disk 115 and plate 108 under the pull of the spring 119.

When the key 140 is depressed and, as stated, the holder 152 is moved away from the toe 114, several things occur. In the first place, the pin 20 of the arm 117, being no longer prevented from moving (because the control ring 113 and its slot 121 are now free to move) the tension of the spring 119 upon the arm 117 becomes effective and moves the arm 117 into frictional engagement with the inner ring 106. In the second place, such frictional engagement communicates the motion of the shell 104 to the arms 117, 117 and through them to the plate 108 and carrier 107. In turn this carrier moves the counter shaft 105 and with it the plate 130 secured to it. This movement then brings one of the rollers 132 in contact with the arm 135 and oscillates the shaft 136 to actuate the mechanism of the adding machine. In the meantime, the movement of the arm 135 has moved the arm 160 away from its engagement with the lip 157 on the latch 155, and the latter, under the tension of the spring 159, is held by its lip 158 in contact with the side of the key stem 141 ready to engage with the notch 145 as the key stem is lifted which occurs almost instantly. How this occurs is as follows:—As soon as the shaft 105 begins to rotate, the cam disk 115 moves with it. This in turn moves the roller 154 which, through the arm 146, has moved the key stem 141 until the lip 158 of the latch 155 is drawn under the notch 145 by the spring 159 to prevent depression of this key stem until the latch 155 is again released. Simultaneously the movement of the roller 154 through the arm 153 oscillates the shaft 150 in a reverse direction and thus restores the roller holder 152 to its position in the path of the toes 114, of the ring 113. As the parts continue to revolve one of the toes 114 of the ring 113 abuts against the holder 152 and is stopped thereby. The arm 117, however, continues to move a slight distance, this being permitted by the clearance in the slot 121, and disengages the surface 118 of such arm from the inner ring 106 and interrupts the communication between the motor 100 and the counter shaft 105. Under the influence of its momentum the plate 108 continues to rotate and stretches the spring 119 until such momentum is overcome and the energy of the spring causes it to begin to move in the opposite direction. In the meantime the roller 127 of the pawl 126 has continued in contact with the edge of the cam disk under the influence of the spring 128 and seated itself in the depression 116. When the reverse movement of the plate 108 begins it is stopped by the roller 127 of this pawl, the spring 119 remaining charged with the energy developed in stretching it. The parts are now in their original positions and are ready for a second actuation.

What I claim as new is:—

1. A continuously rotating member, a shaft mounted near the same and provided with a plurality of clutches each yieldingly pressed toward engagement with the rotating member, a holder normally keeping the clutches out of such engagement, means manually operated temporarily to interrupt the function of said holder and automatic means adapted to restore said function comprising a cam actuated by the shaft which positively moves the holder to its initial position.

2. A continuously rotating member, a shaft mounted near the same and provided with a clutch constantly pressed toward engagement with the rotating member, a holder normally keeping the clutch out of such engagement, manually operated means comprising a key having a dependent stem adapted temporarily to interrupt the function of said holder, automatic means adapted to restore said function in connection with means to supplement such restoration which means are actuated by a part of the mechanism moved from the rotating member.

3. An adding machine comprising a vibratory actuating shaft, a prime motor, a continuously rotating member moved thereby, a shaft mounted near said member and provided with a clutch pressed toward engagement therewith, a holder normally keeping the clutch out of such engagement, means comprising a manually operated key adapted temporarily to interrupt the function of said holder, and means adapted to restore said function automatically operated from the rotating member shaft.

4. An adding machine, comprising a vibratory actuating shaft, a prime motor, a continuously rotating member moved thereby, a shaft mounted near said member and provided with a clutch pressed toward engagement therewith, a holder normally keeping the clutch out of such engagement, means comprising a manually operated key adapted temporarily to interrupt the function of said holder, and means adapted to restore said function automatically operated from the rotation member shaft, and means operated from the actuating shaft of the machine to prevent the depression of the key before the vibratory shaft resumes its normal position.

5. A motor provided with a shaft carrying a worm, a continuously rotating worm wheel meshing therewith, a countershaft driven by said wheel, an adding machine or similar mechanism comprising a vibratory actuating shaft provided with an arm and means for intermittently connecting the arm with the countershaft comprising a plurality of members secured to the countershaft and each adapted to engage the arm of the vibratory shaft whereby the arm is moved through the required angle of oscillation to actuate the machine while the countershaft is making less than one revolution.

6. A motor provided with a shaft carrying a worm, a continuously rotating worm wheel meshing therewith, a countershaft driven by said wheel, an adding machine or similar mechanism comprising a vibratory actuating shaft provided with an arm and means for intermittently connecting the arm with the countershaft comprising three members secured to the countershaft and each adapted to engage the arm of the vibratory shaft whereby the arm is moved through the required angle of oscillation while the countershaft is making one-third of a revolution.

7. A motor, a continuously revolving drum actuated thereby, a countershaft on which said drum is loosely mounted, a carrier rigidly mounted on said shaft, a control ring mounted to oscillate on said carrier and provided with projecting toes, a driving arm eccentrically mounted on the carrier, means for placing a constant tension on the driving arm, a connection between the control ring and the driving arm and a holder adapted normally to keep the driving arm out of contact with the revolving drum inside of which the carrier is mounted.

8. A motor, a continuously revolving drum actuated thereby, a countershaft on which said drum is loosely mounted, a carrier rigidly mounted on said shaft, a control ring mounted to oscillate on said shaft and provided with projecting toes, a driving arm eccentrically mounted on the carrier, means for placing a constant tension on the driving arm, a connection between the control ring and the driving arm, a holder adapted normally to keep the driving arm out of contact with the revolving drum inside of which the carrier is mounted and means for interrupting the action of such holder comprising a key stem, the top of which is near the plane of the keys of the machine.

9. A motor, a continuously revolving drum actuated thereby, a countershaft on which said drum is loosely mounted, a carrier rigidly mounted on said shaft, a control ring mounted to oscillate on said carrier and provided with projecting toes, a driving arm eccentrically mounted on the carrier, means for placing a constant tension on the driving arm, a connection between the control ring and the driving arm, a holder adapted normally to keep the driving arm out of contact with the revolving drum inside of which the carrier is mounted and means for manually interrupting the action of such holder and automatically restoring it.

10. A motor, a continuously revolving drum actuated thereby, a countershaft on which said drum is loosely mounted, a carrier rigidly mounted on said shaft, a control ring mounted to oscillate on said carrier and provided with projecting toes, a driving arm eccentrically mounted on the carrier, means for placing a constant tension on the driving arm, a connection between the control ring and the driving arm, a holder adapted normally to keep the driving arm out of contact with the revolving drum inside of which the carrier is mounted and means for manually interrupting the action of such holder and automatically restoring it, said restoring means comprising a cam disk mounted on the carrier or countershaft and an arm connected with said holder coöperating therewith to restore the latter to its initial position as the cam rotates.

11. A motor, a continuously revolving drum actuated thereby, a countershaft on which said drum is loosely mounted, a carrier rigidly mounted on said shaft, a control ring mounted to oscillate on said carrier and provided with projecting toes, a driving arm eccentrically mounted on the carrier, means for placing a constant tension on the driving arm, a connection between the control ring and the driving arm, a holder adapted normally to keep the driving arm out of contact with the revolving drum inside of which the carrier is mounted and means for manually interrupting the action of such holder and automatically restoring it and which automatic means positively restores the key to its initial position.

In testimony whereof I affix my signature in presence of two witnesses.

CHARLES N. McFARLAND.

Witnesses:
HUBBARD B. PAYNE,
WILLIAM R. BAIRD.